United States Patent Office.

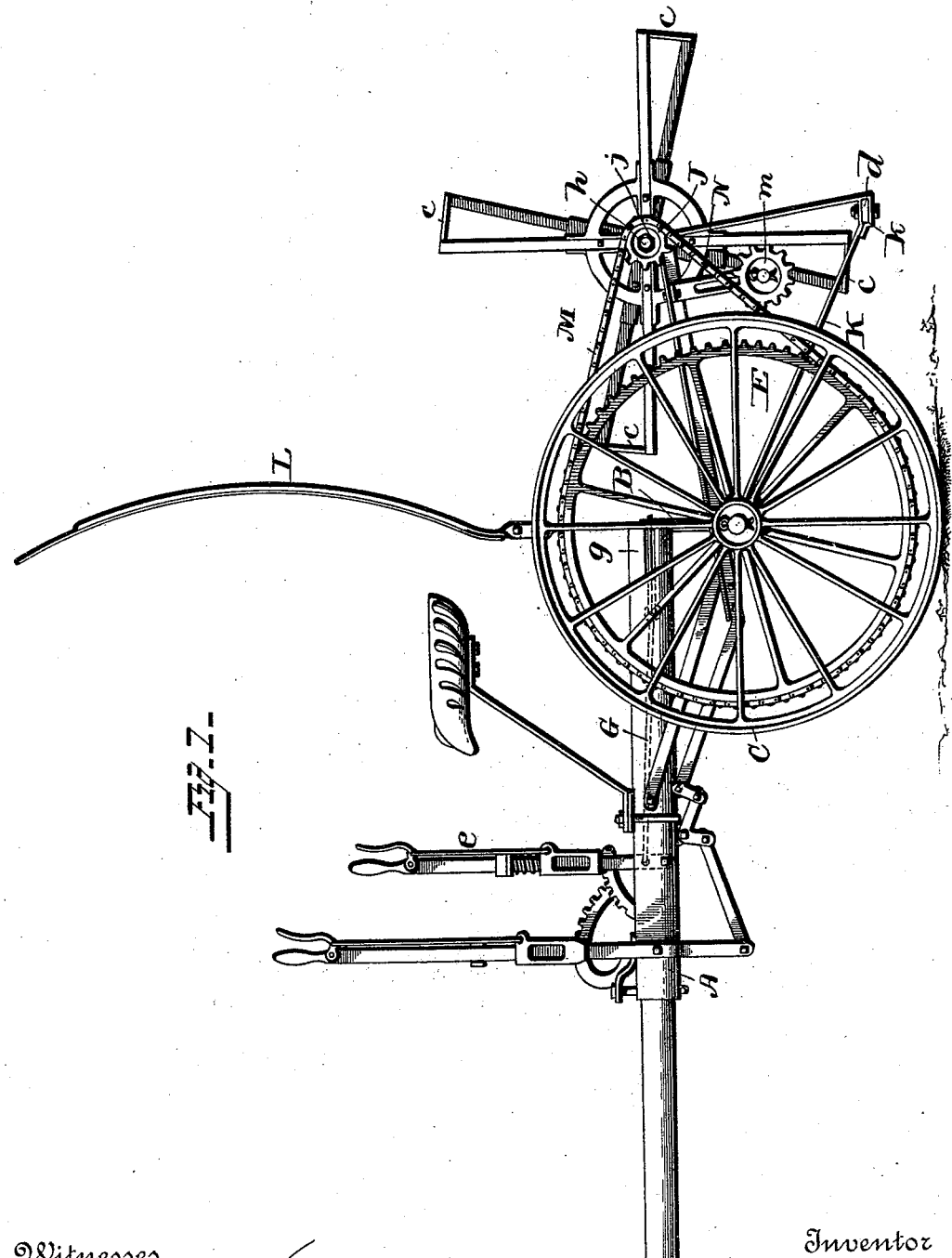

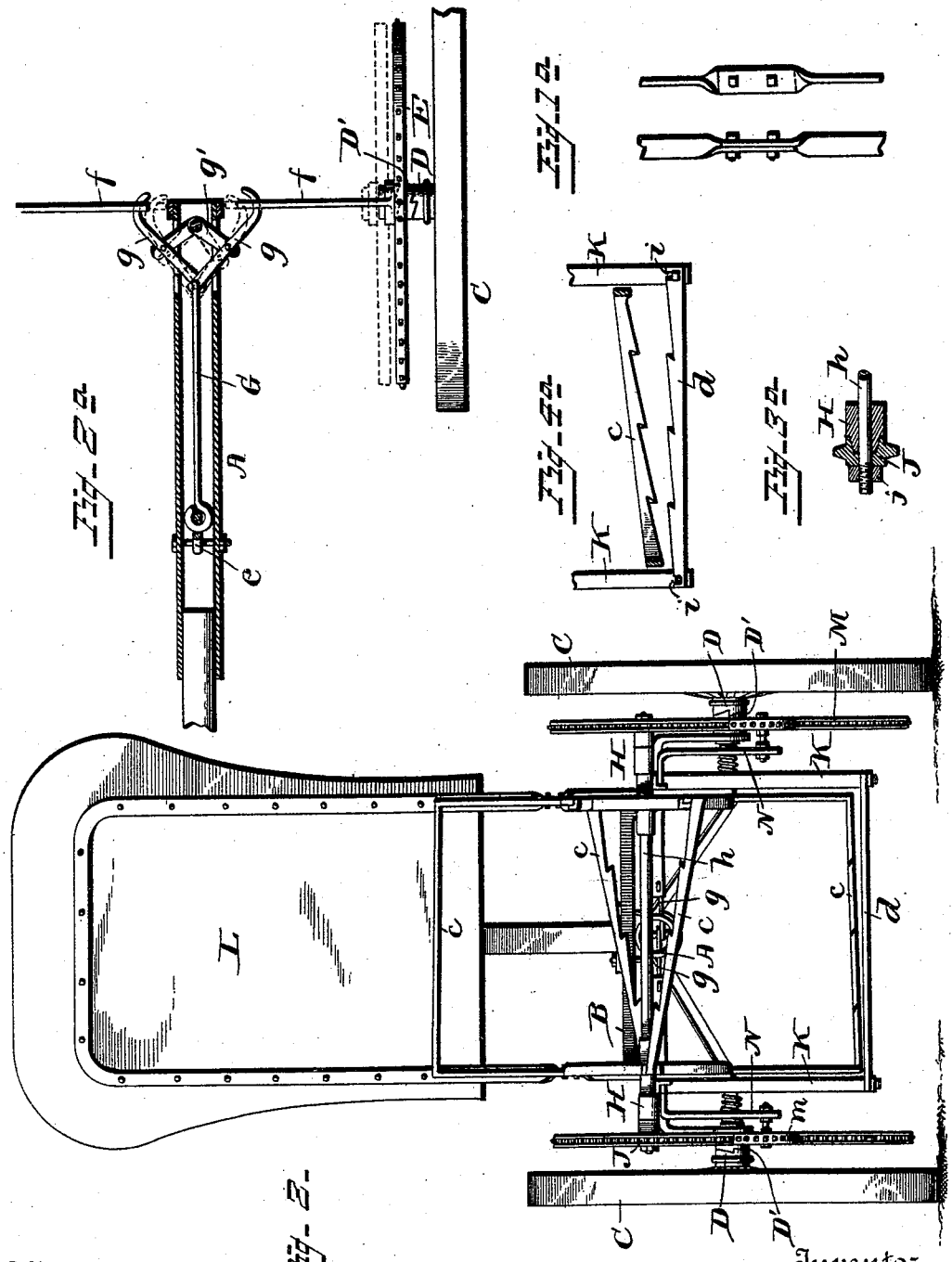

WILL S. JAMES, OF FORT WORTH, ASSIGNOR OF ONE-HALF TO W. D. CROTHERS, OF BROWNWOOD, AND W. L. WARD, OF VICTORIA, TEXAS.

STALK-BREAKER.

SPECIFICATION forming part of Letters Patent No. 494,528, dated March 28, 1893.

Application filed February 9, 1892. Serial No. 420,879. (No model.)

*To all whom it may concern:*

Be it known that I, WILL S. JAMES, a citizen of the United States, residing at Fort Worth, in the county of Tarrant and State of Texas, have invented certain new and useful Improvements in Stalk-Breakers; and I do hereby declare the following to be a full, clear, and exact description of the invention, such as will enable others skilled in the art to which it appertains to make and use the same.

This invention relates to stalk breakers, the object of the same being to provide a machine for breaking the stalks into small pieces and which will be under the control of the driver so as to be thrown in and out of gear at will, and in which the breaker mechanism will be so constructed that it will give when an unyielding substance is run against, thereby preventing breakage or damage to the machine.

The improvement consists of the novel features and the peculiar construction and combination of the parts which will be hereinafter more fully described and claimed and which are shown in the annexed drawings, in which;

Figure 1 is a side view of a stalk breaking machine embodying my invention. Fig. 2 is a rear view of a machine. Fig. 1ª shows respectively a rear and front elevation of the joint formed between the guard frame and the standard which are projected up from the frame of the machine. Fig. 2ª is a detail view of the mechanism for throwing the drive wheel in and out of gear with the supporting wheels of the machine. Fig. 3ª is a detail section showing the manner of securing the sprocket pinion on the reel shaft. Fig. 4ª is a detail view showing the relative arrangement of the stationary breaker bar and the breaker bars carried by the reel.

The tongue A, which is tubular, is connected with the arch shaped axle B on the spindle arms of which are mounted the wheels C. These wheels are provided on the inner ends of the hubs with half clutches D which engage with corresponding half clutches D' on the outer hub ends of the sprocket wheels E which are mounted on the spindle ends of axle B and are adapted to move thereon to and from the wheel C whereby the half clutches D and D' may be geared or unshipped as required. The rods *f* connected at their outer ends with the sprocket wheels E have openings at their inner ends which are engaged by the hooked ends of the grapples *g*, which hooked ends pass through the said open ends of the rods *f*. These grapples are connected together at one end by the rod G which is in connection with the operating lever *e* by means of which the said grapple can be operated to throw the sprocket wheel E in and out of gear with the supporting wheels C. The links *g'* pivotally connected together at their inner ends and having connection at their outer ends with the said grapples, serve to control the motion of the latter on operating the lever *e*.

The reel shaft *h* is provided near each end with a boss H having a cone bearing on which is mounted the sprocket pinion J, the latter being held in frictional contact with the said cone bearing by means of the nut *j* which is screwed on the threaded end of the shaft *h*. Should the reel strike an unyielding substance the pinion J will slip and turn on the cone bearing, before any injury can result. The breaker bars *c* are notched on their front or active edges and are set obliquely to a plane at right angles to the line of draft of the said machine. The stationary breaker bar *d* having slots *i* near its ends is held to suitable brace bars K by bolts which pass through the said bars K, the slots *i* and through clips *k*. The slots *i* open out on the front edge of the bar *d*, hence under abnormal strain the bar *d* will slip from its fastenings before serious damage can occur. The guard L located in the rear of the driver's seat and in front of the reel, prevents the stalks from being thrown forward to the annoyance and inconvenience of the driver.

In the operation of the machine, motion is transmitted from the gear wheels E to the reel by means of the sprocket chains M which pass around the said gear wheels E and the pinions *j*. The proper degree of tension is maintained from the sprocket chains M by means of the idle spur pinions *m* which are mounted in slotted hangers N.

Having thus described my invention, what I claim, and desire to secure by Letters Patent, is—

1. In a stalk breaker the combination with the stationary breaker bar $d$, of the reel having notched breaker bars $c$, extending from one side of the machine to the other in an oblique direction substantially as and for the purpose described.

2. In a stalk breaker the combination with the notched breaker bar $d$, of the reel having corresponding notched breaker bars, extending from one side of the machine to the other in an oblique direction substantially as and for the purpose described.

3. In a stalk breaker, the combination with the reel having breaker bars, and the braces K and the clips $k$, of the breaker bar $d$ having slots $i$ and fastening bolts passing through the said braces K, clips $k$ and the slots $i$ in the said breaker bar $d$, substantially as and for the purpose set forth.

4. In a stalk breaker, the combination with bar $d$ the reel provided with breaker bars $c$, the axle, wheels C loosely mounted on the axle and having half clutches D, and the gear wheels E mounted on the said axle and provided with half clutches D' and adapted to actuate the said reel, of the bars $f$ having connection at their outer ends with the said gear wheels, grapples $g$ pivoted together at one end, and having their free ends curved and adapted to engage with the inner ends of the rods $f$, links $g'$ pivotally connected together at one end, and having their other ends pivotally connected with the said grapples $g$ midway of their ends, rod G connected with the pivoted ends of the grapples and a lever having connection with the said rod G for purposes of operating the same, substantially as and for the purpose described.

5. In a stalk breaker, the combination with the reel shaft having bosses H which are provided with cone bearings, of sprocket pinions mounted on the said reel shaft and cone bearings, a nut for holding the said pinion in frictional contact with the cone bearing, and means for actuating the said pinion for operating the reel, substantially as and for the purpose described.

In testimony whereof I affix my signature in presence of two witnesses.

WILL S. JAMES.

Witnesses:
R. T. SKILES,
A. V. KIRKPATRICK.